United States Patent
Murto et al.

(10) Patent No.: US 12,083,938 B2
(45) Date of Patent: Sep. 10, 2024

(54) OFF-ROAD RACING VEHICLE SEAT

(71) Applicant: RECARO Automotive North America, LLC, Clinton Township, MI (US)

(72) Inventors: Michael Murto, Berkley, MI (US); Adrienne Hautamaki, Canton, MI (US); Rohit Pandey, Westland, MI (US); Steven Rollet, Farmington Hills, MI (US); Marty Martinez, Fenton, MI (US); Vaughn Gittin, Jr., Charlotte, NC (US)

(73) Assignee: RECARO AUTOMOTIVE NORTH AMERICA, LLC, Clinton Township, MI (US)

( * ) Notice: Subject to any disclaimer, the term of this patent is extended or adjusted under 35 U.S.C. 154(b) by 0 days.

(21) Appl. No.: 18/193,301

(22) Filed: Mar. 30, 2023

(65) Prior Publication Data

US 2023/0234484 A1     Jul. 27, 2023

Related U.S. Application Data

(63) Continuation of application No. 17/507,861, filed on Oct. 22, 2021, now Pat. No. 11,648,856.
(Continued)

(51) Int. Cl.
*B60N 2/427* (2006.01)
*B60N 2/64* (2006.01)
*B60N 2/68* (2006.01)

(52) U.S. Cl.
CPC ......... *B60N 2/42754* (2013.01); *B60N 2/646* (2013.01); *B60N 2/686* (2013.01)

(58) Field of Classification Search
CPC ..... B60N 2/686; B60N 2/42754; B60N 2/646
(Continued)

(56) References Cited

U.S. PATENT DOCUMENTS

| | | | | |
|---|---|---|---|---|
| 2,892,489 | A | * 6/1956 | Hurley | A47C 7/185 267/145 |
| 3,325,213 | A | * 6/1967 | Levy | B60R 22/105 297/484 |

(Continued)

FOREIGN PATENT DOCUMENTS

| | | |
|---|---|---|
| CN | 104903146 A | 9/2015 |
| DE | 102009011736 A1 | 9/2010 |

(Continued)

*Primary Examiner* — Milton Nelson, Jr.
(74) *Attorney, Agent, or Firm* — John A. Miller; Shumaker, Loop & Kendrick, LLP

(57) ABSTRACT

A seat for an off-road racing vehicle including a single piece molded shell having a seat back with a head rest, side panels and a seat bottom with a thigh support, where the shell is covered by an upholstery. The seat also includes a seat cushion positioned on the seat bottom and having two foam layers, namely, a top thin foam layer and a bottom thick energy absorbing foam layer that are secured together, where the combination of the layers is capable of absorbing high energy Z-direction forces. In one non-limiting embodiment, the top layer is a methylenediphenyl isocyanate (MDI) polyurethane foam and is 12 mm thick, and the bottom layer is an open-cell energy absorbing urethane foam and is 38 mm thick.

8 Claims, 1 Drawing Sheet

Related U.S. Application Data

(60) Provisional application No. 63/107,912, filed on Oct. 30, 2020.

(58) Field of Classification Search
USPC ............ 297/219.12, 452.12, 452.14, 452.15
See application file for complete search history.

(56) References Cited

U.S. PATENT DOCUMENTS

| | | | | |
|---|---|---|---|---|
| 3,556,595 | A * | 1/1971 | Bartel | A47C 5/125 |
| | | | | 297/344.1 |
| 3,642,323 | A * | 2/1972 | Taylor | A47C 5/125 |
| | | | | 297/452.17 |
| 4,951,334 | A | 8/1990 | Maier | |
| 5,630,240 | A | 5/1997 | Matsuoka et al. | |
| 6,079,780 | A * | 6/2000 | Bapst | B60N 2/286 |
| | | | | 33/759 |
| 6,315,363 | B1 * | 11/2001 | Frear | B60N 2/24 |
| | | | | 297/487 |
| 6,481,792 | B1 | 11/2002 | Goin | |
| 6,969,114 | B2 | 11/2005 | Keilhauer | |
| 7,111,888 | B1 * | 9/2006 | Dehart | B60N 2/885 |
| | | | | 296/68.1 |
| 7,926,871 | B2 * | 4/2011 | Meixner | B60N 2/888 |
| | | | | 297/216.12 |
| 8,696,067 | B2 | 4/2014 | Galbreath et al. | |
| 9,266,455 | B2 | 2/2016 | Uramichi et al. | |
| 9,434,244 | B2 * | 9/2016 | Sunsdahl | B60K 17/348 |
| 9,950,647 | B2 * | 4/2018 | Freeman | B60N 2/24 |
| 2002/0149253 | A1 * | 10/2002 | MacDonald | B60N 2/686 |
| | | | | 297/452.14 |
| 2004/0129489 | A1 * | 7/2004 | Brasseal | B62D 31/00 |
| | | | | 180/350 |
| 2005/0140199 | A1 | 6/2005 | Kang et al. | |
| 2012/0068519 | A1 | 3/2012 | Lhommeau et al. | |
| 2012/0248839 | A1 | 10/2012 | Fujita et al. | |
| 2012/0252916 | A1 | 10/2012 | Sasaki et al. | |
| 2014/0182049 | A1 | 7/2014 | Prust et al. | |
| 2018/0194253 | A1 * | 7/2018 | Jonsson | B60N 2/4242 |
| 2019/0010301 | A1 | 1/2019 | Ichimura et al. | |
| 2019/0100122 | A1 | 4/2019 | Hagedorn et al. | |

FOREIGN PATENT DOCUMENTS

| | | | |
|---|---|---|---|
| DE | 102016219385 A1 | | 10/2017 |
| KR | 2009000104184 | * | 10/2009 |
| WO | 0036951 A1 | | 6/2000 |
| WO | 2019171329 A1 | | 9/2019 |

* cited by examiner

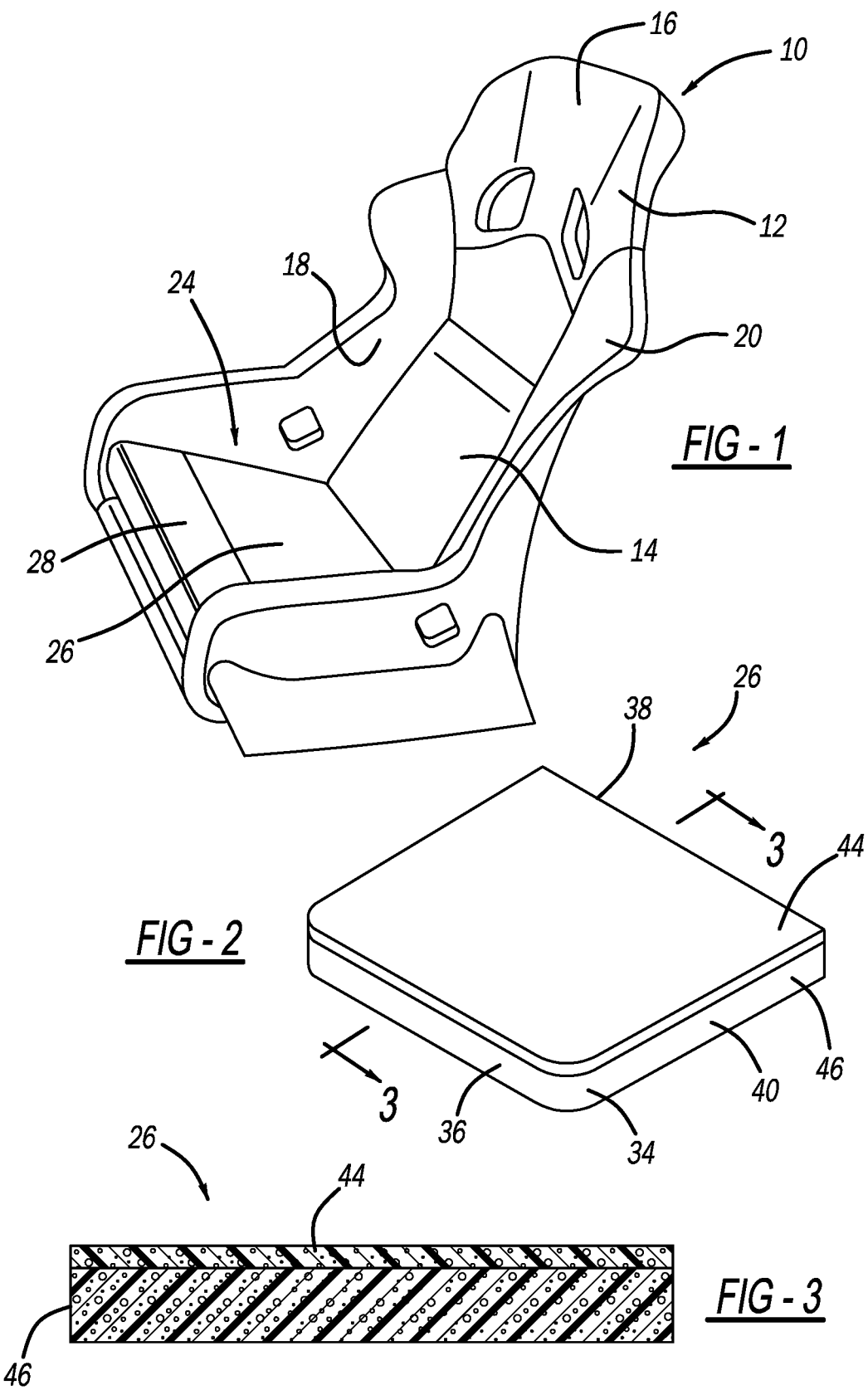

OFF-ROAD RACING VEHICLE SEAT

CROSS-REFERENCE TO RELATED APPLICATIONS

This application is a continuation application of U.S. Ser. No. 17/507,861, titled, Performance Seat Cushion, filed Oct. 22, 2021, now U.S. Pat. No. 11,648,856, which claims the benefit of the filing date of provisional application 63/107,912, titled, Performance Seat Cushion, filed Oct. 30, 2020.

BACKGROUND

Field

This disclosure relates generally to a seat cushion and, more particularly, to a performance seat cushion for a seat in a high-performance off-road racing vehicle, where the seat cushion includes a thin top polyurethane layer and a thick bottom energy absorbing foam layer.

Discussion of the Related Art

Off-road racing is a form of motorsports that employs specially-modified high performance vehicles, such as trucks, cars, buggies, etc. Some forms of off-road racing include tracks having jumps, washboard runs, etc. where the vehicle often goes airborne at significant heights. Often times when the vehicle lands, the suspension bottoms out creating significant downward forces on the driver that may be absorbed by the drivers spine, possibly causing spinal and other injuries.

The seats, sometimes referred to as racing shells, used in off-road racing vehicles are usually a one-piece molded fiberglass or carbon fiber part that is wrapped in an upholstery, where foam pieces may be provided between the fiberglass and upholstery at desirable locations. The seat is configured to conform to the driver and hold him/her as stationary as possible in response to lateral forces on the vehicle during the racing. The bottom of the seat often includes a seat cushion that provides some level of comfort and protection from Z-direction impacts. High energy impact foams are known to be used in the art for these seat cushions, such as those available from BSCI Energy Impact Systems, Inc. of Mooresville, N.C., USA. However, injuries still periodically occur, and thus those and other seat cushions can be improved to better protect the driver from large Z-direction impacts on the vehicle.

SUMMARY

The following discussion discloses and describes a seat for an off-road racing vehicle including a single piece molded shell having a seat back with a head rest, side panels and a seat bottom with a thigh support, where the shell is covered by an upholstery. The seat also includes a seat cushion positioned on the seat bottom and having two foam layers, namely, a top thin foam layer and a bottom thick energy absorbing foam layer that are secured together, where the combination of the layers is capable of absorbing high energy Z-direction forces. In one non-limiting embodiment, the top layer is a methylenediphenyl isocyanate (MDI) polyurethane foam and is 12 mm thick, and the bottom layer is an open-cell energy absorbing urethane foam and is 38 mm thick.

Additional features of the disclosure will become apparent from the following description and appended claims, taken in conjunction with the accompanying drawings.

BRIEF DESCRIPTION OF THE DRAWINGS

FIG. 1 is an isometric view of a vehicle seat including an energy absorbing seat cushion;

FIG. 2 is an isometric view of the seat cushion separated from the seat shown in FIG. 1; and FIG. 3 is a cross-sectional view of the seat cushion separated from the seat shown in FIG. 1.

DETAILED DESCRIPTION OF THE EMBODIMENTS

The following discussion of the embodiments of the disclosure directed to a seat cushion for a seat in a high performance off-road racing vehicle, where the seat cushion includes a thin top polyurethane layer and a thick bottom energy absorbing foam layer, is merely exemplary in nature, and is in no way intended to limit the disclosure or its applications or uses. For example, as discussed, the seat cushion has particular application for a seat for a high performance off-road racing vehicle. However, as will be appreciated by those skilled in the art, the seat cushion may have application for other seats.

FIG. 1 is an isometric view of a vehicle seat 10 of the type that would be provided in a vehicle used for off-road racing. The seat 10 generally has an ergonomic configuration that at least somewhat conforms to the driver's body and holds the driver in the seat 10 in response to side-ways forces. The seat 10 is generally a one-piece molded fiberglass or carbon fiber part that is wrapped in an upholstery layer 12, where foam pieces of various thicknesses may be provided between the fiberglass and the upholstery layer 12 at desirable locations. The seat 10 includes a seat back 14 having a head rest 16, side panels 18 and 20 and a seat bottom 24 having a seat cushion 26 and a thigh support 28.

As will be discussed in detail below, the seat cushion 26 is designed to absorb downward forces to provide protection for the driver from large Z-direction impacts. FIG. 2 is an isometric view and FIG. 3 is a cross-sectional view of the seat cushion 26 separated from the seat 10. The seat cushion 26 has a general square configuration with rounded corners 34 at a front edge 36 proximate the thigh support 28. In one non-limiting embodiment, the front edge 36 is 335 mm wide, a rear edge 38 is 350 mm wide and a side edge 40 is 315 mm deep. The seat cushion 26 includes two foam layers, namely, a top thin foam layer 44 and a bottom thick energy absorbing foam layer 46 that are secured together, such as by a suitable glue, where the combination of the layers 44 and 46 is capable of absorbing high energy Z-direction forces. In one non-limiting embodiment, the top foam layer 44 is a methylenediphenyl isocyanate (MDI) polyurethane foam and is 12 mm thick, and the bottom foam layer 46 is an open-cell energy absorbing urethane foam, such as that available from BSCI Energy Impact Systems, Inc. of Mooresville, N.C., USA, and is 38 mm thick, so that the seat cushion 26 has an overall thickness of 50 mm.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A seat for an off-road racing vehicle, said seat comprising:
   a single piece molded shell including a seat back having a head rest, side panels and a seat bottom having a thigh support; and
   a seat cushion positioned on the seat bottom, said cushion including a top methylenediphenyl isocyanate polyurethane foam layer being 12 mm thick and a bottom open-cell energy absorbing urethane foam layer being 38 mm thick that combine to absorb Z-direction impact forces.

2. The seat according to claim 1 wherein a front edge of the seat cushion is 335 mm wide, a rear edge of the seat cushion is 350 mm wide and a side edge of the seat cushion is 315 mm deep.

3. The seat according to claim 1 wherein the shell is fiberglass.

4. The seat according to claim 1 wherein the shell is carbon fiber.

5. A seat cushion comprising a top methylenediphenyl isocyanate polyurethane foam layer being 12 mm thick and a bottom open-cell energy absorbing urethane foam layer being 38 mm thick that combine to absorb Z-direction impact forces.

6. The seat cushion according to claim 5 wherein a front edge of the seat cushion is 335 mm wide, a rear edge of the seat cushion is 350 mm wide and a side edge of the seat cushion is 315 mm deep.

7. The seat cushion according to claim 5 wherein the seat cushion has a general square configuration with rounded front corners.

8. The seat cushion according to claim 5 wherein the seat cushion is for a seat for a racing vehicle.

* * * * *